United States Patent
Kosal

(10) Patent No.: US 6,545,086 B1
(45) Date of Patent: Apr. 8, 2003

(54) SILICONE PRESSURE SENSITIVE ADHESIVE COMPOSITIONS

(75) Inventor: Jeffrey Alan Kosal, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/969,565

(22) Filed: Oct. 1, 2001

(51) Int. Cl.$^7$ .............................................. C08L 83/06
(52) U.S. Cl. .................. 524/806; 524/261; 524/267; 524/588; 524/837; 525/477; 528/34; 528/500; 528/501; 528/502 A
(58) Field of Search ........................... 525/477; 528/34; 524/261, 267, 806, 588

(56) References Cited

U.S. PATENT DOCUMENTS

| | | | |
|---|---|---|---|
| 4,518,727 A | 5/1985 | Traver | 524/35 |
| 4,525,502 A | 6/1985 | Traver | 524/96 |
| 4,655,767 A | 4/1987 | Woodard et al. | 604/896 |
| 4,791,163 A | 12/1988 | Traver et al. | 524/506 |
| 5,330,747 A | 7/1994 | Krzysik | 424/63 |
| 5,451,610 A | 9/1995 | Krzysik | 424/63 |
| 5,612,400 A | 3/1997 | Gross et al. | 524/268 |

OTHER PUBLICATIONS 07331220 121995 JPX.

*Primary Examiner*—Robert Dawson
*Assistant Examiner*—Marc S Zimmer
(74) *Attorney, Agent, or Firm*—Jim L. DeCesare

(57) ABSTRACT

A pressure sensitive adhesive emulsion comprises a disperse silicone phase emulsified in a continuous water phase in the presence of a surfactant. The disperse silicone phase comprises 40–80 percent by weight of a silicone pressure sensitive adhesive, which is the product of mixing a silanol-terminated polydiorganosiloxane of Tg below –20° C. with a silanol-containing silicone resin of Tg above 0° C., dispersed in 60–20 percent by weight of a volatile silicone fluid having a boiling point below 300° C. The emulsion is substantially free of any non-silicon atom containing volatile organic material.

16 Claims, No Drawings

SILICONE PRESSURE SENSITIVE ADHESIVE COMPOSITIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is related to silicone pressure sensitive adhesive compositions, and particularly to such compositions in the form of aqueous dispersions or emulsions. Silicone pressure sensitive adhesives are used for example in paper coatings, as release modifying additives to organic pressure sensitive adhesives and in medical and personal care applications.

BACKGROUND OF THE INVENTION

U.S. Pat. No. 4,791,163 (Dec. 13, 1988) describes an aqueous emulsion comprising an organic pressure sensitive adhesive and a silicone pressure sensitive adhesive. Japanese Patent 07331220 (Dec. 19, 1995) describes an aqueous silicone emulsion adhesive composition comprising an alkenyl organopolysiloxane, a resin comprising triorganosiloxy units and $SiO_2$ units (MQ resin), an organohydrogenpolysiloxane, an emulsifier and a platinum catalyst.

U.S. Pat. No. 5,612,400 (Mar. 18, 1997) describes a silicone pressure sensitive adhesive composition comprising 100 parts of an organopolysiloxane of viscosity at least 500000 cps, 60 to 300 parts of a MQ resin having 0.2 to 5 percent silicon-bonded hydroxyl radicals and a ratio of 0.6–1.2:1 triorganosiloxy units to $SiO_2$ units, and 20–2500 parts of a linear or cyclic volatile organosiloxane fluid of boiling point 95–250° C.

U.S. Pat. No. 5,330,747 (Jul. 19, 1994) and U.S. Pat. No. 5,451,610 (Sep. 19, 1995) describe personal care preparations, particularly eye cosmetics such as mascara, comprising a trimethylsilyl-endblocked benzene-soluble resinous copolymer containing silicon-bonded hydroxyl radicals, a silanol-endblocked polydiorganosiloxane fluid and a phenyl-containing polysiloxane fluid of viscosity 5–60000 centiStokes at 25° C. The composition can optionally contain a volatile silicone such as hexamethyldisiloxane or octamethylcyclotetrasiloxane.

BRIEF SUMMARY OF THE INVENTION

A pressure sensitive adhesive emulsion according to the invention comprises a disperse silicone phase emulsified in a continuous water phase in the presence of a surfactant, wherein the disperse silicone phase comprises 40 to 80 percent by weight of a silicone pressure sensitive adhesive, which is the product of mixing a silanol-terminated polydiorganosiloxane of Tg below −20° C. with a silanol-containing silicone resin of Tg above 0° C., dispersed in 60 to 20 percent by weight of a volatile silicone fluid having a boiling point below 300° C., the emulsion being substantially free of any non-silicon-containing volatile organic material.

The invention also includes a process for the production of a pressure sensitive adhesive emulsion comprising mixing the silicone pressure sensitive adhesive defined above, the volatile silicone fluid having a boiling point below 300° C., and a surfactant, and adding water optionally containing surfactant while shearing to form an emulsion.

The invention also includes a process for the production of a pressure sensitive adhesive emulsion comprising mixing the silicone pressure sensitive adhesive defined above with the volatile silicone fluid having a boiling point below 300° C. and adding the resulting mixture to an aqueous solution of a surfactant while shearing.

The invention further includes methods for the production of a pressure sensitive adhesive emulsion of reduced volatile content, wherein an emulsion as defined above is subjected to steam stripping, or is contacted with a hydrophobic pervaporation membrane, or is heated with removal of volatile material while adding water to the emulsion to compensate for water which is removed.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

The silicone pressure sensitive adhesive generally comprises the product of mixing a silanol-terminated polydiorganosiloxane of Tg below −20° C. lightly crosslinked with a silanol-containing silicone resin of Tg above 0° C. The organic substituents of the silanol-terminated polydiorganosiloxane are generally alkyl groups having 1 to 6 carbon atoms or phenyl groups. Preferably at least 80 percent of the organic substituents are methyl groups. Most preferably the silanol-terminated polydiorganosiloxane is a dimethylhydroxy-terminated polydimethylsiloxane. The silanol-terminated polydiorganosiloxane preferably has a viscosity of at least 0.1 Pa.s and can have viscosity up to 30000 Pa.s or higher. It can for example be prepared by the method of U.S. Pat. No. 5,319,120.

The silanol-containing silicone resin is generally a nonlinear siloxane resin and preferably consists of siloxane units of the formula $R'_a SiO_{4-a/2}$ wherein R' denotes a hydroxyl, hydrocarbon or hydrocarbonoxy group and wherein a has an average value of from 1 to 1.8. The resin preferably consists of monovalent trihydrocarbonsiloxy (M) groups of the formula $R''_3 SiO_{1/2}$ and tetrafunctional (Q) groups $SiO_{4/2}$ wherein R'' denotes a monovalent hydrocarbon group having 1 to 6 carbon atoms, preferably a methyl group. The number ratio of M groups to Q groups is preferably in the range 0.5:1 to 1.2:1 (equivalent to a value of a in the formula $R'_a SiO_{4-a/2}$ of 1.0 to 1.63), and is more preferably 0.6:1 to 0.9:1. The resin preferably contains at least 0.2 percent by weight up to about 3 or 5 percent silicon-bonded hydroxy radicals. These are preferably present as dimethylhydroxysiloxy $(HO)(CH3)_2 SiO_{1/2}$ units.

The silicone pressure sensitive adhesive preferably comprises 20 to 80 parts by weight, preferably 30 to 60 parts, of the silanol-terminated polydiorganosiloxane of Tg below −20° C., and 80 to 20 parts by weight, preferably 70 to 40 parts, of the silanol-containing silicone resin of Tg above 0° C. Most preferably the silicone pressure sensitive adhesive is the product of mixing 30 to 60 parts by weight of a silanol-terminated polydiorganosiloxane of Tg below −20° C. and viscosity 0.1–30000 Pa.s at 25° C. with 40 to 70 parts by weight of a silanol-containing silicone resin of Tg above 0° C. comprising monovalent trihydrocarbonsiloxy (M) groups of the formula $R''_3SiO_{1/2}$ and tetrafunctional (Q) groups $SiO_{4/2}$ wherein R" denotes a monovalent hydrocarbon group having 1 to 6 carbon atoms, the number ratio of M groups to Q groups being in the range 0.5:1 to 1.2:1.

The silanol groups of the polydiorganosiloxane generally undergo some condensation reaction with the silanol groups of the silicone resin so that the polydiorganosiloxane is lightly crosslinked by the silicone resin (that is, polydiorganosiloxane chains are bonded together through resin molecules to give chain branching and entanglement and/or a small amount of network character) to form the silicone pressure sensitive adhesive. A catalyst, for example an alkaline material such as ammonia, ammonium hydroxide or ammonium carbonate can be mixed with the silanol-terminated polydiorganosiloxane and the silicone resin to promote this crosslinking reaction. It may for example be preferred, particularly for personal care and medical applications, that the silanol-terminated polydiorganosiloxane has a viscosity in the range 1–100 Pa.s at 25° C. and is crosslinked with the aid of a catalyst. The amounts of silanol-terminated polydiorganosiloxane and silanol-containing silicone resin are preferably such that the Tg of the product of mixing is between −15 and 15° C. (T at tan delta maximum). The silanol-containing silicone resin preferably lowers the rubbery plateau modulus (G' at Tg+30° C.) of the blend below 7E+05 dyne/cm2; this is an indication that the network character is due to light crosslinking as discussed above rather than extensive crosslinking.

The silicone pressure sensitive adhesive produced by mixing the silanol-terminated polydiorganosiloxane and silanol-containing silicone resin may be chemically treated to react silanol groups with an endblocking agent which introduces triorganosilyl units, as described in U.S. Pat. No. 4,655,767. The endblocking agent can for example be a disilazane such as hexamethyldisilazane or a trialkyl alkoxy silane such as trimethyl ethoxy silane or trimethyl methoxy silane. Reaction with such an end blocking agent reduces the sensitivity of the adhesive to loss of adhesion in contact with reagents such as amines.

The volatile silicone fluid of boiling point below 300° C. can be a linear or cyclic polysiloxane, preferably a polydiorganosiloxane in which the organo groups are hydrocarbon groups having 1 to 6 carbon atoms, and most preferably a polydimethylsiloxane. Examples of suitable linear polysiloxanes are hexamethyldisiloxane, octamethyltrisiloxane, decamethyltetrasiloxane and/or dodecamethylpentasiloxane. Examples of suitable cyclic polysiloxanes are decamethylcyclopentasiloxane, octamethylcyclotetrasiloxane and/or dodecamethylcyclohexasiloxane. Mixtures of linear and/or cyclic polydimethylsiloxanes can be used, for example mixtures of viscosity from 0.65 up to 3.0 or 4.0 cSt at 25° C.

The volatile silicone fluid is preferably used at 30–150 percent by weight, most preferably 50–100 percent, based on the silicone pressure sensitive adhesive (blend of silanol-terminated polydiorganosiloxane and silanol-containing silicone resin). The volatile silicone fluid allows the silicone pressure sensitive adhesive to be processed as a liquid of handleable viscosity so that it can be emulsified, without introducing undesirable volatile organic hydrocarbons such as toluene or xylene.

The surfactants may be selected from anionic, cationic, nonionic or amphoteric surfactants. Mixtures of one or more of these may also be used. Suitable anionic organic surfactants include alkali metal soaps of higher fatty acids, alkyl aryl sulphonates, for example sodium dodecyl benzene sulphonate, long chain (fatty) alcohol sulphates, olefin sulphates and sulphonates, sulphated monoglycerides, sulphated esters, sulphonated ethoxylated alcohols, sulphosuccinates, alkane sulphonates, phosphate esters, alkyl isethionates, alkyl taurates and/or alkyl sarcosinates. Suitable cationic organic surfactants include alkylamine salts, quaternary ammonium salts, sulphonium salts and phosphonium salts. Suitable nonionic surfactants include siloxane polyoxyalkylene copolymers, condensates of ethylene oxide with a long chain (fatty) alcohol or (fatty) acid, for example a $C_{12-16}$ alcohol, condensates of ethylene oxide with an amine or an amide, condensation products of ethylene and propylene oxides, esters of glycerol, sucrose or sorbitol, fatty acid alkylol amides, sucrose esters, fluorosurfactants and fatty amine oxides. Suitable amphoteric organic detergent surfactants include imidazoline compounds, alkylaminoacid salts and betaines. It is more preferred that the organic surfactants are nonionic or anionic. Mixtures of anionic and nonionic surfactants are particularly preferred.

A preferred process for the production of the pressure sensitive adhesive emulsion is an inversion process comprising mixing the silicone pressure sensitive adhesive and the volatile silicone fluid with the surfactant and adding water while shearing to form an emulsion. The water which is added can be merely water but preferably contains surfactant. The surfactant added with the water can be the same as or different to the surfactant mixed with the silicone pressure sensitive adhesive and the volatile silicone fluid. Most preferably the surfactants are different, with the surfactant which is added in the water is more hydrophilic than the surfactant which is mixed with the silicone pressure sensitive adhesive and the volatile silicone fluid. We have found that the best way to make an inversion emulsion of the pressure sensitive adhesive is to have an oleophilic/more hydrophobic surfactant mixed into the oil phase blend of silicone pressure sensitive adhesive and volatile silicone fluid before adding the water, which has the more hydrophilic surfactant premixed into it, to the oil phase. Usually an ionic (anionic or cationic) surfactant, for example an alkyl aryl sulphonate in amine or alkali metal salt form, is more hydrophilic than a nonionic surfactant, for example an ethoxylated fatty alcohol, acid, amine or amide. Where two nonionic surfactants are used, that containing a higher proportion of ethylene oxide units to fatty alcohol, acid, amine or amide is generally more hydrophilic.

The particle size of the emulsion formed is generally in the range 200 nanometer (nm) to 50 microns; the lower particle size emulsions are produced by application of high shear, for example in a homogeniser, sonolator, microfluidiser or a high shear mixer of the rotor and stator type.

In another preferred inversion procedure, the silicone pressure sensitive adhesive and the volatile silicone fluid are first mixed with a surfactant and a small amount of water to form a viscous oil in water emulsion ("thick phase"). The amount of water added at this stage is generally at least 0.5 percent based on the total weight of silicone pressure sensitive adhesive and volatile silicone fluid, preferably at least 1 percent up to 10 or 20 percent. Further water can subsequently be added, for example from 20 or 30 percent up to 100 or 200 percent, to form a diluted emulsion of suitable viscosity for the desired application.

Alternatively the emulsion can be formed by a dispersion process comprising mixing the silicone pressure sensitive adhesive with the volatile silicone fluid and adding the resulting mixture to an aqueous solution of the surfactant while shearing.

We have found that the inclusion of a thickener in the aqueous phase prior to the mixing of the aqueous phase with the siloxane composition when using the dispersion process, produces a more uniform, stable emulsion than without the inclusion of the thickener. The thickener can for example be a water soluble polysaccharide such as xanthan gum, a cellulose ether such as methyl cellulose or hydroxypropyl cellulose, or gum tragacanth, a carboxyvinyl polymer or polyvinyl alcohol. Such a thickener can be used in the aqueous phase in an inversion process also.

The pressure sensitive adhesive emulsion of the invention delivers performance properties such as controlled tack and lubrication and can be used for example in paper coatings, such as adhesive labels and envelope sealing strips, in adhesive modifiers such as release modifying additives for organic pressure sensitive adhesives, in personal care applications to give greater durability, protective qualities, water resistance and barrier properties, for example in eye cosmetics such as mascara and in sunscreen formulations as described in U.S. Pat. No. 5,451,610, and in medical applications such as transdermal drug delivery patches, described for example in U.S. Pat. No. 5,162,410, or to hold an active material such as a fungicide to the skin surface. The avoidance of hydrocarbon based solvents is generally desirable in medical and personal care applications, and also in paper coating applications where evaporation of organic solvent can be a fire hazard.

For some uses it may be desirable to remove the volatile silicone fluid from the emulsion before use. In one process according to the invention for the production of a pressure sensitive adhesive emulsion of reduced volatile content, an emulsion as described above is subjected to steam stripping. Steam or superheated steam is blown through the emulsion with extraction of volatile materials so that the volatile silicone fluid is partly or wholly removed from the emulsion, leaving an emulsion of the silicone pressure sensitive adhesive in water with surfactant In an alternative process according to the invention for the production of a pressure sensitive adhesive emulsion of reduced volatile content, the emulsion is heated with removal of volatile material while adding water to the emulsion to compensate for water which is removed. The emulsion can be fed continuously to a continuous flow device for vaporizing liquids in which the mixture is subjected to vaporization in the continuous flow device. The emulsion can for example be fed to the top of a falling thin film evaporator or spinning band film evaporator. An overhead fraction of the volatile siloxane oligomers is continuously removed from the continuous flow device, while an unvaporized bottom fraction is continuously removed from the continuous flow device. A preheated stripping gas such as steam, nitrogen, air, or argon, is fed to the continuous flow device in a manner that results in either a cocurrent or countercurrent flow through the device. The unvaporized bottom fraction consists of an emulsion containing the silicone pressure sensitive adhesive which is substantially free of any residual volatile silicone fluid.

In a further alternative process according to the invention for the production of a pressure sensitive adhesive emulsion of reduced volatile content, the emulsion is contacted with a hydrophobic pervaporation membrane, that is a membrane that preferentially permeates the volatile silicone fluid. As the feed liquid flows along the membrane surface, the preferentially permeated volatile siloxane passes through the membrane as a vapor. Transport through the membrane is induced by maintaining a vapor pressure on the permeate side of the membrane that is lower than the partial pressure of the feed liquid. The pressure difference is achieved by maintaining a vacuum, or by providing an inert purge such as air or nitrogen on the permeate side of the membrane. The permeate vapor is preferably condensed. The condensate is removed as a two-phase mixture containing primarily volatile silicone and water. The residue, a silicone pressure sensitive oil-in-water emulsion depleted of the volatile silicone fluid, exits on the feed side of the membrane. It is generally desirable to separate the volatile silicone from the water in the condensed permeate to facilitate the re-use or disposal of the materials. Suitable methods for separating volatile silicones from water include passing the two-phase mixture through a separating device, such as a settling tank, cyclone, centrifuge, coalescer, separating membrane, or a combination of such devices.

The pressure sensitive adhesive emulsion of reduced volatile content can in general be used in all the applications mentioned above for the emulsion.

EXAMPLES

The following examples are set forth in order to illustrate the invention in more detail.

Example 1

60 percent by weight of a pressure sensitive adhesive comprising 35 parts by weight polydimethylsiloxane, hydroxy terminated, of viscosity about 13 Pa.s mixed with 65 parts MQ resin of M/Q ratio in the range 0.6 to 0.9 and a small amount of ammonia catalyst was mixed with 40 percent octamethyltetrasiloxane to form a low tack PSA blend. To a single cup Hauschild dental mixer with a 12 second mix cycle was added 37.4 g of the PSA blend and 2.76 g Stepan Bio-Soft N-300, an anionic TEA-Docecylbenzene sulfonate surfactant. This was mixed for 1 cycle, then 10 drops deionised water were added and mixed 1 cycle. Water addition was repeated until the mixture became inverted (4.34 g water had been added), forming a thick phase emulsion. This was confirmed to be an oil in water emulsion that easily dispersed into water. Microtrac UPA 150 particle size analysis showed a trimodal peak with diameter/volume percent values of: 4.09 microns (24 percent volume), 1.47 microns (70 percent volume), 0.326 microns (6 percent volume).

Examples 2–4

Following the procedure of Example 1, three different PSA polymer types (i) the low tack PSA of Example 1 used in Example 2, (ii) a high tack PSA containing a higher proportion of polydimethylsiloxane to resin used in Example 3; and (iii) a medium tack with an intermediate proportion of polydimethylsiloxane to resin used in Example 4; were emulsified using the above inversion process. The PSA's were solvated/diluted with hexamethyldisiloxane, a linear low molecular weight volatile silicone with a viscosity of 0.65 cSt., rather than octamethyltetrasiloxane as volatile silicone fluid. A two cup dental mixer unit was used. 123.2 g PSA blend was mixed with 5.60 g N-300 surfactant and 1.40 g ICI Brij 30, a nonionic polyethoxylated (4 moles) lauryl ether surfactant, was added to the formulation as a second surfactant before adding water (15 drops per cycle). The mix cycle was 20 seconds at full rotation and planetary rotation speeds. Thick oil in water emulsions were produced in all cases. Mastersizer particle size analysis showed a monomodal particle size distribution in all three emulsions. The mean particle sizes were:
Example 2—5.78 microns
Example 3—10.1 microns
Example 4—9.4 microns Example 5

2340 g of the pressure sensitive adhesive of Example 1 was diluted with 1260 g hexamethyldisiloxane to form a PSA blend and was mixed in a Turrello mixer with 60 g Brij 30 surfactant for 10 minutes. 165 g N-300 surfactant was dissolved in 705 g water and added to the mixer at impeller speed 500 rpm. This was increased to 2600 rpm until the mixture inverted to a thick oil in water emulsion and mixing was continued for 30 minutes more. The mixer speed was reduced and the emulsion was diluted with 1464 g water containing 6 g Kathon® CG biocide. Mastersizer particle size analysis showed a monomodal peak with an average particle size of 9.2 microns.

Example 6

123.2 g of the PSA blend of Example 5 was mixed with 5.60 g Brij 35L surfactant, a 72 percent aqueous solution of polyethoxylated (23 moles) lauryl ether, and 2.10 g Brij 30 surfactant, and then with water using the procedure of Example 2. 9.10 g water was added to form a thick phase oil in water emulsion which could easily be dispersed into water. Mastersizer particle size analysis showed a biomodal particle size distribution with mean particle size of 16.4 microns.

Example 7

1.25 g Kelzan xanthan gum thickener was dissolved in 181.25 g water and 13.75 g N-300 surfactant was slowly added. 300.0 g of the PSA blend of Example 5 was added while the mixer speed was gradually increased to 1750 rpm. Mixing was continued for 10 minutes, then 3.75 g Brij 30 was added and mixed for 30 minutes. The aqueous emulsion formed had mean particle size 9.62 microns with a monomodal distribution. The particle size could be reduced to below 1 micron by use of a high shear mixer.

Example 8

The process of Example 7 was repeated omitting a thickener. The emulsion produced was thinner and not as smooth and creamy as the emulsion of Example 8, and had mean particle size 28.5 microns with broad monomodal distribution.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A pressure sensitive adhesive emulsion comprising a disperse silicone phase emulsified in a continuous water phase in the presence of a surfactant; the disperse silicone phase comprising 40–80 percent by weight of a silicone pressure sensitive adhesive, the silicone pressure sensitive adhesive being the product obtained by mixing a silanol terminated polydiorganosiloxane of Tg below −20° C. with a silanol containing silicone resin of Tg above 0° C., the silicone pressure sensitive adhesive being dispersed in 60–20 percent by weight of a volatile silicone fluid having a boiling point below 300° C.; the emulsion being free of any non-silicon atom containing volatile organic material.

2. A pressure sensitive adhesive emulsion according to claim 1 wherein the silicone pressure sensitive adhesive is the product of mixing 30–60 parts by weight of a silanol-terminated polydiorganosiloxane of Tg below −20° C. and viscosity 0.1–30000 Pa.s at 25° C. with 40–70 parts by weight of a silanol-containing silicone resin of Tg above 0° C. comprising monovalent trihydrocarbonsiloxy (M) groups of the formula $R''_3SiO_{1/2}$ and tetrafunctional (Q) groups $SiO_{4/2}$ wherein R" denotes a monovalent hydrocarbon group having 1 to 6 carbon atoms, the number ratio of M groups to Q groups being in the range 0.5:1 to 1.2:1.

3. A pressure sensitive adhesive emulsion according to claim 2 wherein the silanol-terminated polydiorganosiloxane has a viscosity of 1–100 Pa.s at 25° C.

4. A pressure sensitive adhesive emulsion according to claim 1 wherein the said product of mixing has been chemically treated to react silanol groups with an endblocking agent which introduces triorganosilyl units.

5. A pressure sensitive adhesive emulsion according to claim 1 wherein the surfactant comprises at least one non-ionic surfactant.

6. A pressure sensitive adhesive emulsion according to claim 5 wherein the surfactant comprises a mixture of an anionic surfactant and a nonionic surfactant.

7. A pressure sensitive adhesive emulsion according to claim 1 wherein the volatile silicone fluid comprises decamethylcyclopentasiloxane.

8. A pressure sensitive adhesive emulsion according to claim 1 wherein the volatile silicon e fluid comprises octamethylcyclotetrasiloxane.

9. A pressure sensitive adhesive emulsion according to claim 1 wherein the volatile silicone fluid comprises linear polydimethylsiloxane of viscosity 0.65 to 3.0 cSt at 25° C.

10. A process for the production of a pressure sensitive adhesive emulsion according to claim 1 comprising mixing the silicone pressure sensitive adhesive and the volatile silicone fluid with the surfactant and adding water while shearing to form an emulsion.

11. A process according to claim 10 wherein the water which is added contains a surfactant.

12. A process according to claim 11 wherein the surfactant which is added in the water is more hydrophilic than the surfactant which is mixed with the silicone pressure sensitive adhesive and the volatile silicone fluid.

13. A process for the production of a pressure sensitive adhesive emulsion according to claim 1 comprising mixing the silicone pressure sensitive adhesive with the volatile silicone fluid and adding the resulting mixture to an aqueous solution of the surfactant while shearing.

14. A process for the production of a pressure sensitive adhesive emulsion of reduced volatile content wherein an emulsion according to claim 1 is subjected to steam stripping.

15. A process for the production of a pressure sensitive adhesive emulsion of reduced volatile content, wherein an emulsion according to claim 1 is heated with removal of volatile material while adding water to the emulsion to compensate for water which is removed.

16. A process for the production of a pressure sensitive adhesive emulsion of reduced volatile content wherein an emulsion according to claim 1 is contacted with a hydrophobic pervaporation membrane.

* * * * *